(12) United States Patent
Parra

(10) Patent No.: US 7,988,127 B2
(45) Date of Patent: Aug. 2, 2011

(54) VALVE WITH SELF-EXPANDING SEALS

(76) Inventor: Gregory J Parra, Huntington Beach, CA (US)

( * ) Notice: Subject to any disclaimer, the term of this patent is extended or adjusted under 35 U.S.C. 154(b) by 688 days.

(21) Appl. No.: 11/968,133

(22) Filed: Dec. 31, 2007

(65) Prior Publication Data

US 2008/0157016 A1  Jul. 3, 2008

Related U.S. Application Data

(60) Provisional application No. 60/882,694, filed on Dec. 29, 2006.

(51) Int. Cl.
*F16K 25/00* (2006.01)
(52) U.S. Cl. .......... 251/172; 251/192
(58) Field of Classification Search .......... 251/170, 251/172, 192, 214, 315.1, 314
See application file for complete search history.

(56) References Cited

U.S. PATENT DOCUMENTS

| | | | |
|---|---|---|---|
| 3,192,942 A | 7/1965 | Manor et al. | |
| 3,653,631 A * | 4/1972 | Hurst | 251/159 |
| 4,096,880 A | 6/1978 | Lemmon et al. | |
| 4,099,705 A * | 7/1978 | Runyan | 251/171 |
| 4,531,537 A | 7/1985 | Smith | |
| 4,531,711 A | 7/1985 | Bunch et al. | |
| 4,576,385 A | 3/1986 | Ungchusri et al. | |
| 4,658,847 A * | 4/1987 | McCrone | 137/72 |
| 4,796,858 A | 1/1989 | Kabel | |
| 4,886,241 A | 12/1989 | Davis et al. | |
| 5,078,175 A | 1/1992 | Martin et al. | |
| 5,129,625 A | 7/1992 | Wood et al. | |
| 5,163,692 A * | 11/1992 | Schofield et al. | 277/436 |
| 5,338,003 A | 8/1994 | Beson | |
| 5,494,256 A | 2/1996 | Beson | |
| 5,593,166 A | 1/1997 | Lovell et al. | |
| 5,732,731 A | 3/1998 | Wafer | |
| 5,842,498 A * | 12/1998 | Locke et al. | 137/315.07 |
| 6,345,805 B1 | 2/2002 | Chatufale | |
| 6,554,024 B2 | 4/2003 | Mefford et al. | |
| 6,587,195 B1 | 7/2003 | Jennings | |
| 7,083,160 B2 | 8/2006 | Baumann | |

\* cited by examiner

*Primary Examiner* — John K Fristoe, Jr.
*Assistant Examiner* — Andrew J Rost
(74) *Attorney, Agent, or Firm* — Myers Andras Sherman & Zarrabian LLP; Joseph C. Andras

(57) ABSTRACT

A valve device includes a valve body having a cavity, a stopper member in the cavity, and a fluid passage in fluidic communication with the cavity when the valve device is in an open state. A stem is coupled to the stopper member for driving the stopper member to open or close the valve. The stem extends through a stem aperture in the valve body. A first self-expanding seal around the stem is used to seal off an annular gap around the stem. A second self-expanding seal and a third self-expanding seal are disposed around the fluid passage substantially concentrically to prevent leakage. A method for assembling and sealing the valve device, and a valve system are also provided.

15 Claims, 6 Drawing Sheets

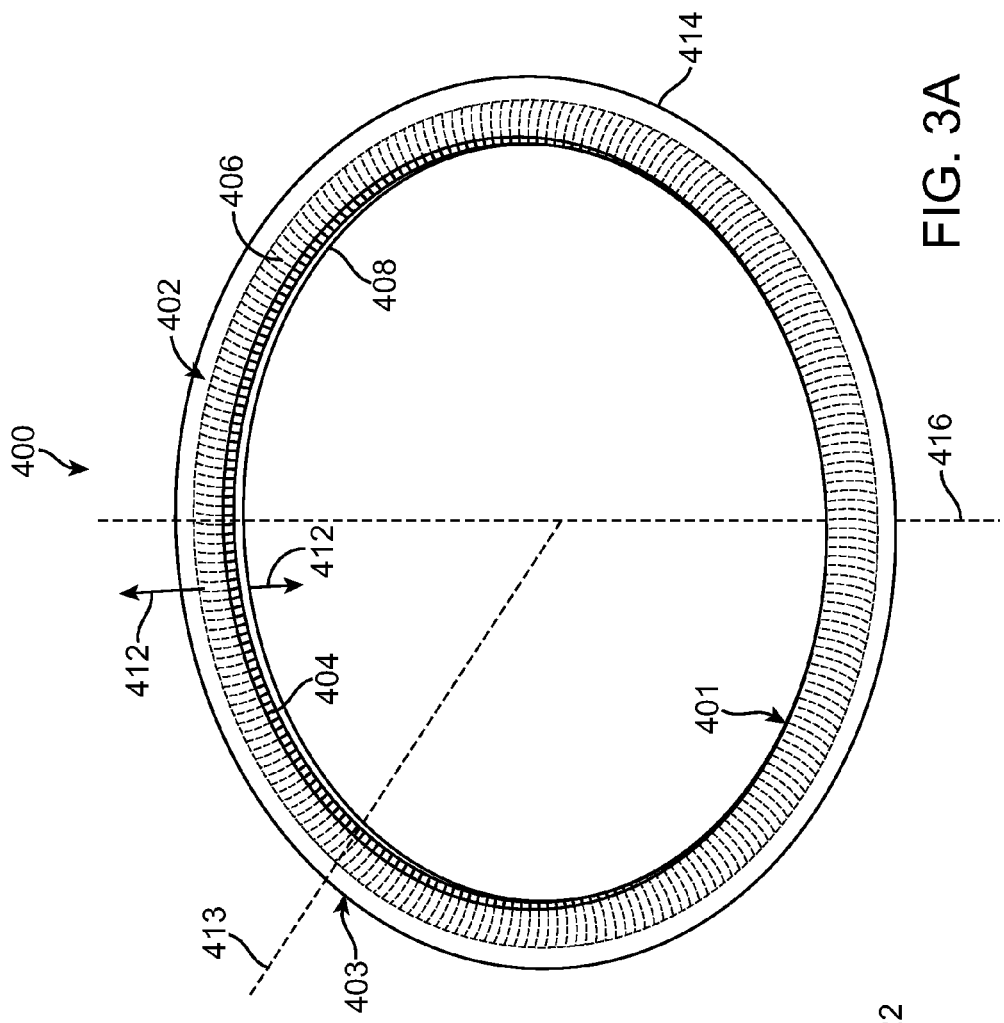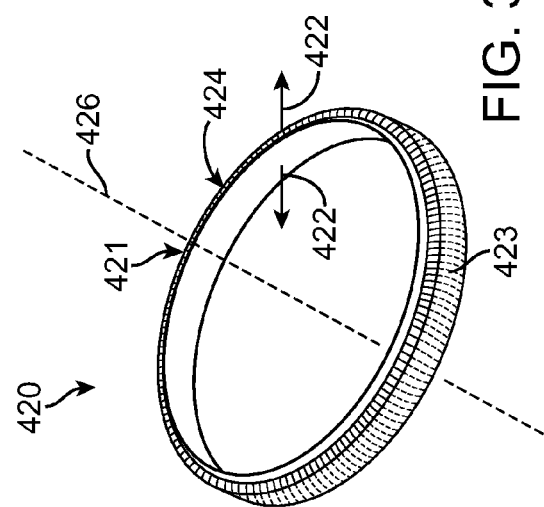

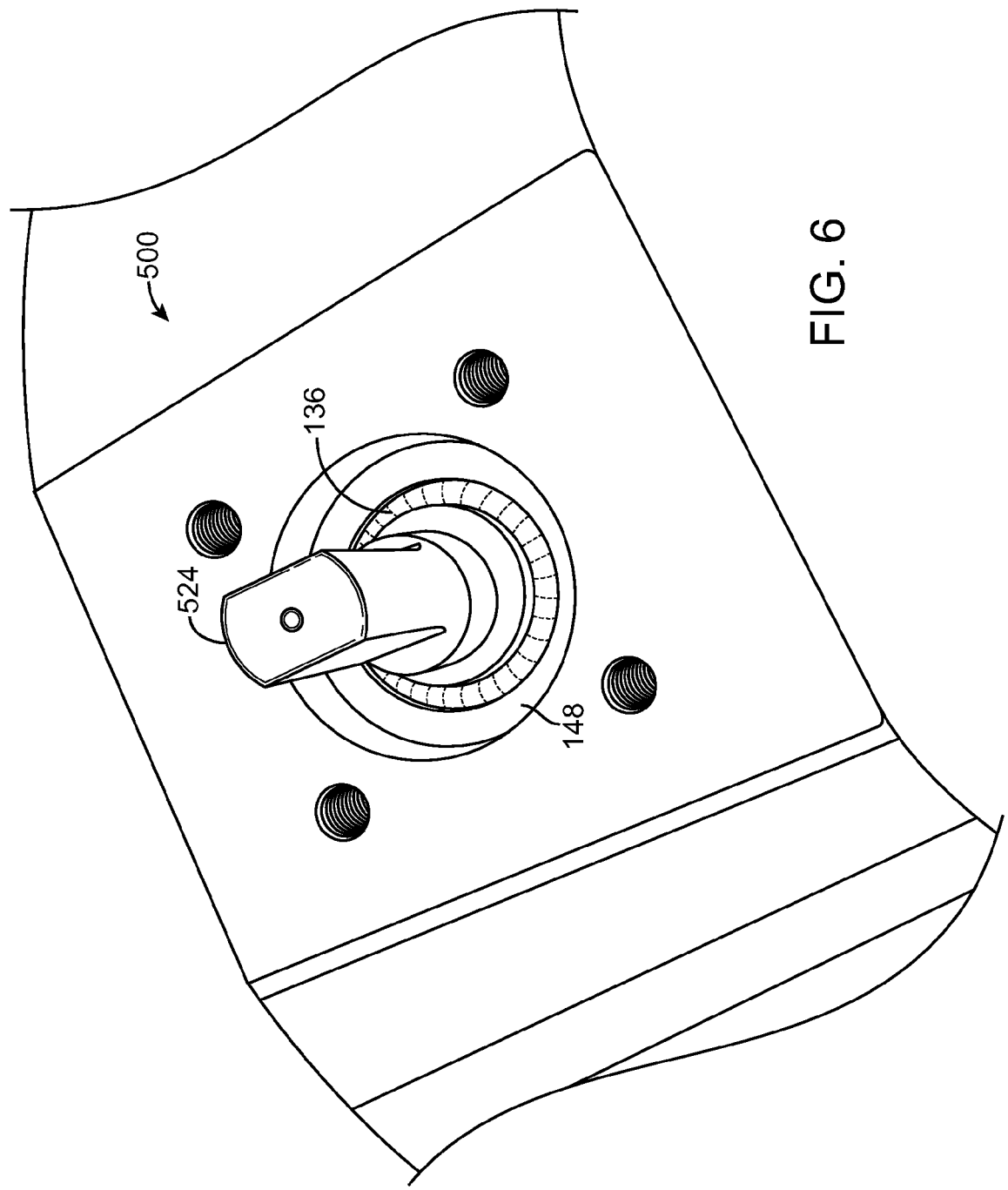

VALVE WITH SELF-EXPANDING SEALS

RELATED APPLICATIONS

This application claims priority of U.S. Provisional Patent Application Ser. No. 60/882,694 filed on Dec. 29, 2006 and entitled "BALL VALVE WITH LOW TORQUE STEM SEAL AND ENHANCED END CAP SEALS," the disclosure of which is hereby incorporated by reference in its entirety.

BACKGROUND OF THE INVENTION

1. Field of the Invention

The invention relates generally to valves and, more particularly, to the sealing of ball valves.

2. Description of Prior Art and Related Information

Various types of valves are used to control flow of fluids, such as liquid and gas, through pipes or flow lines. Most common types of valves include ball valves and plug valves. The fluids may be in a wide range of pressure, temperature, and viscosity. A sealing system is required to prevent pressurized fluids from escaping the valves, and particularly at gaps in the interconnections between pipes and valves. Conventional valves have relied on O-ring or square-ring or other shape seals that are made of elastomeric or polymeric materials such as rubber or polytetrafluoroethylene (PTFE, commonly under the trade name TEFLON®). Such elastomeric or polymeric materials need to be compressed to effectively seal the gaps.

For cryogenic applications, both liquid and gaseous phases of fluids are involved. In addition, the low temperature associated with cryogenic applications tends to cause the valve parts and pipes, which are usually made of metals, to contract, thus enlarging the gaps therebetween. And, conventional O-ring seals become less effective under low temperature because of the change in their elastomeric properties.

SUMMARY OF THE INVENTION

In accordance with the present invention, structures and associated methods are disclosed that address needs in sealing valves in various applications including cryogenic applications and overcome the deficiencies of the prior art.

In one aspect, a valve device is provided including a valve body having a cavity, a stopper member disposed in the cavity, a fluid passage in fluidic communication with the cavity when the valve device is in an open state, a stem coupled to the stopper member for driving the stopper member to open or close the valve, a stem aperture in the valve body for the stem to extend therethrough, a first self-expanding seal (SES) around the stem, and a second SES and a third SES around the fluid passage, wherein second SES is bound by the third SES. In the preferred embodiment, as shown, the second SES and the third SES are substantially concentric, but the positioning could be substantially non-concentric provided that the outer (third) SES surrounds the inner (second) SES.

In one embodiment, the first SES is an annular seal and has a substantially C-shaped cross section with an open end and an opposing closed end, and wherein the open end points substantially toward the cavity such that the first SES is configured to expand in a radial direction to seal off a gap in the stem aperture between the stem and the valve body when the first SES is subject to a pressure from the cavity. The valve body may have a stepped recess in the stem aperture for receiving the first SES. The device may further include a nut for securing the stem to the valve body, and a bushing configured to seat against a top bearing surface of the stepped recess and to be pressed by the nut, wherein the a height of the stepped recess is slightly larger than a thickness of the first SES such that the bushing does not substantially compress the first SES at the closed end. In one embodiment, a gap is formed between the bushing and the stem such that the bushing does not substantially press against the stem. The nut may be a hand tighten nut such that a friction at the top bearing surface is sufficiently low to realize a low-torque stem operation.

In one embodiment, the device further includes a seat assembly for seating the stopper member and for forming a seal with the stopper member when the device is in a closed state. The seat assembly is telescopically mounted into the cavity, and the second SES is an annular seal and has a substantially C-shaped cross section with an open end and an opposing closed end. The open end is substantially along a direction of the fluid passage and pointing away from the cavity such that the second SES is configured to expand in a radial direction to seal off a gap between the seat assembly and the valve body when the second SES is subject to a pressure from the fluid passage. In one embodiment, the device further includes an end cap configured to couple to the valve body. The third SES is an annular seal and has a substantially C-shaped cross section with an open end and an opposing closed end. The open end points substantially toward the fluid passage such that the third SES expands along its axial direction and seals off a gap between the end cap and the valve body when the third SES is subject to a pressure from the fluid passage.

In one embodiment, the seat assembly has a stepped recess for receiving the second SES. The open end of the second SES is substantially flush with an outer surface of the valve body when the seat assembly is telescopically mounted into the cavity. The outer surface has a groove for receiving the third SES such that the third SES and the second SES are substantially concentric in a plane along the gap between the end cap and the valve body.

In one embodiment, the stopper member is a ball having a through hole. The ball is coupled to the stem at a proximal end to be rotated by the stem to open or close the valve and is floating on a distal end. The seat assembly may include a non-metal seat member to form the seal with the ball, and a seat retainer for retaining the seat member.

In a preferred embodiment, each of the first SES, the second SES, and the third SES includes an annular pocket member with a substantially C-shaped cross section, and a spring member substantially enclosed in the annular pocket member for initially expanding the annular pocket member. The annular pocket member may be made of one of the following materials: polytetrafluoroethylene, plastic, and rubber.

In another aspect, a method is provided for assembling and sealing a valve device, including providing a valve body having a cavity and a stem aperture, disposing a stopper member in the cavity, providing a fluid passage in fluidic communication with the cavity when the valve device in an open state, disposing a stem through the stem aperture and coupling the stem to the stopper member at a proximal end while leaving a distal end of the stopper member floating, providing a plurality of self-expanding seals (SES), disposing a first SES around the stem, and disposing a second SES and a third SES substantially concentrically around the fluid passage.

In a preferred embodiment, providing a plurality of SES includes providing the first SES as an annular seal having a substantially C-shaped cross section with an open end and an opposing closed end. Disposing the first SES includes disposing the open end substantially toward the cavity such that the first SES is configured to expand in a radial direction and seal off a gap in the stem aperture between the stem and the valve body when the first SES is subject to a pressure from the cavity. Providing the valve body may include providing the valve body having a stepped recess in the stem aperture for receiving the first SES. The method may further include disposing a bushing to seat against a top bearing surface of the stepped recess without compressing the first SES, and tightening a nut onto the stem against the bushing. Tightening the nut is preferably though hand tightening such that a friction at the top bearing surface is sufficiently low for achieving a low-torque stem operation.

In one embodiment, the method further includes providing a seat assembly for seating the stopper member and for forming a seal with the stopper member when the device is in the closed state, and telescopically mounting the seat assembly into the cavity. Providing a plurality of SES includes providing the second SES as an annular seal having a substantially C-shaped cross section with an open end and an opposing closed end. Disposing the second SES includes pointing the open end of the second SES substantially along a direction of the fluid passage and away from the cavity such that the second SES is configured to expand in a radial direction to seal off a gap between the seat assembly and the valve body when the second SES is subject to a pressure from the fluid passage. The method may further include coupling an end cap to the valve body. Providing a plurality of SES may include providing the third SES as an annular seal having a substantially C-shaped cross section with an open end and an opposing closed end. Disposing the third SES may include pointing the open end of the third SES substantially toward the fluid passage such that the third SES is configured to expand longitudinally along its axial direction and seal off a gap between the end cap and the valve body when the third SES is subject to a pressure from the fluid passage.

In one embodiment, providing the seat assembly includes providing a seat member and a seat retainer having a stepped recess for receiving the second SES, and coupling the seat member and the seat retainer to form the seat assembly. The method may further include coupling the second SES with the seat retainer at the stepped recess. Telescopically mounting the seat assembly into the cavity includes press fitting the seat assembly and the second SES into the cavity such that the open end of the second SES is substantially flush with an outer surface of the valve body. Disposing the third SES further includes disposing the third SES into a groove on the outer surface of the valve body such that the third SES and the second SES are substantially concentric within a plane along the gap between the end cap and the valve body. The third SES protrudes slightly from the plane. In the preferred embodiment, as shown, the second SES and the third SES are substantially concentric, but the positioning could be non-concentric provided that the outer (third) SES still surrounds the inner (second) SES.

In a further aspect, a valve system is provided including a valve body having a cavity, a stopper member disposed in the cavity, a fluid passage in fluidic communicating with the cavity when the valve device is in an open state, a stem coupled to a proximal end of the stopper member for driving the stopper member to open or close the valve system, wherein a distal end of the stopper member is floating, a stem aperture in the valve body for the stem to extend therethrough, a first self-expanding seal (SES) around the stem configured to expand in a radial direction orthogonal to an axial direction of the first SES, and a second SES and a third substantially concentric around the fluid passage. The second SES and the third SES are configured to expand in their respective directions orthogonal to each other.

In summary, a valve device includes a valve body having a cavity, a stopper member in the cavity, and a fluid passage in fluidic communication with the cavity when the valve device is in an open state. A stem is coupled to the stopper member for driving the stopper member to open or close the valve. The stem extends through a stem aperture in the valve body. A first self-expanding seal around the stem is used to seal off an annular gap around the stem. A second self-expanding seal and a third self-expanding seal are disposed around the fluid passage substantially concentrically to prevent leakage. A method for assembling and sealing the valve device, and a valve system are also provided.

The invention, now having been briefly summarized, may be better visualized by turning to the following drawings wherein like elements are referenced by like numerals.

BRIEF DESCRIPTION OF THE DRAWINGS

FIGS. 3A and 3B are perspective views of self-expanding seals in accordance with embodiments of the invention;

FIG. 6 is a top view of the ball valve of FIG. 4, showing a self-expanding stem seal.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

Figure 1:
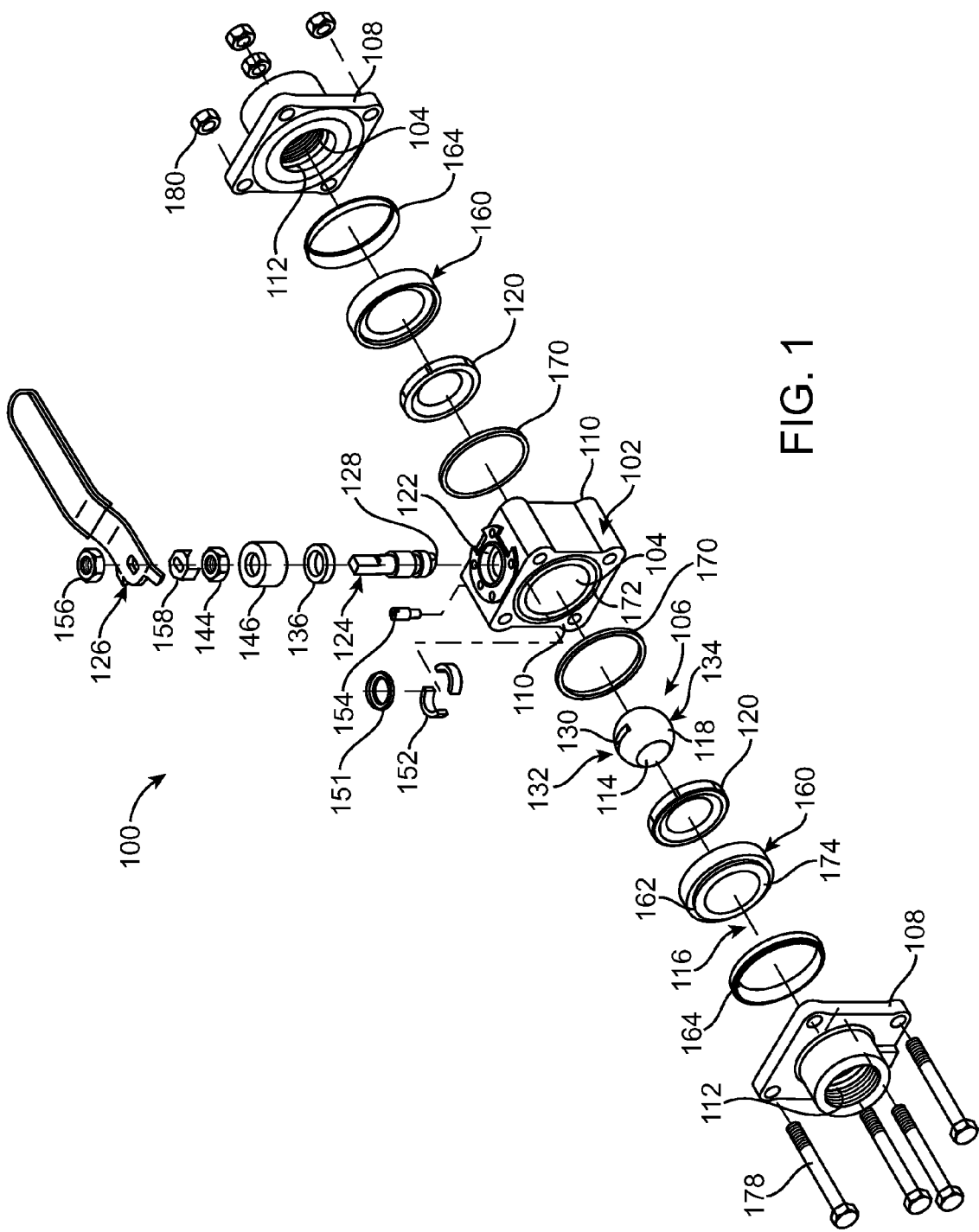
FIG. 1 is an exploded view of a first preferred embodiment of a ball valve according to the present invention.
Figure 2:
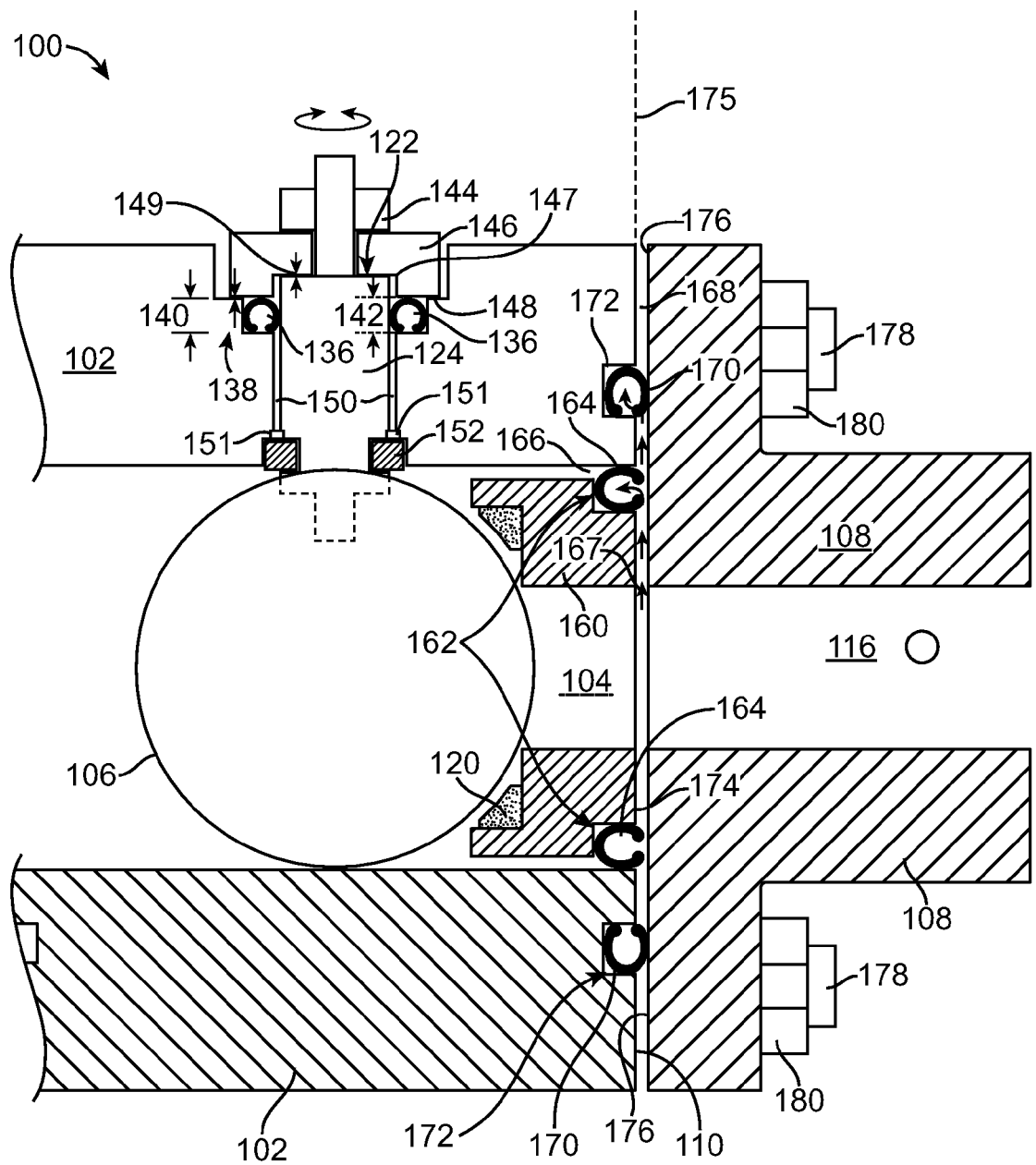
FIG. 2 is partial cross-sectional side view of the ball valve of FIG. 1 when fully assembled, with exaggerated gaps.

As shown in FIGS. 1 and 2, a preferred embodiment of a valve device 100 comprises a valve body 102 having a central cavity 104, in which a stopper member, such as a ball 106, is disposed. Those of ordinary skill in the art will recognize that, although embodiments of the invention are described herein with respect to ball valves, the concepts of the invention can also be applied to other types of valves such as plug valves.

A pair of end caps 108 are coupled to the valve body 102 at outer surfaces 110, thus enclosing the ball 106 in the cavity 104. When the ball valve 100 is in its open state, ports 112 in the end caps 108 are aligned with a through hole 114 of the ball 106 forming a fluid passage or flow path 116, allowing fluid to flow therethrough.

When the through hole 114 is transverse to the fluid passage 116, a surface 118 of the ball 106 seals against ball seat members 120 that are coaxial with the fluid passage 116, and the valve 100 is closed. When the ball 106 is rotated such that the through hole 114 is at least partially aligned with the fluid passage 116, fluid can flow through the valve 100.

The valve body 102 has a stem aperture 122 for a stem 124 to extend therethrough. The stem 124 is connected to a manual drive mechanism such as a handle 126, or a motorized drive mechanism. One end of the stem 124 includes a tab 128 coupled to a notch 130 on a proximal end 132 of the ball 106 for rotating the ball 106 using the handle 126. In accordance with a preferred embodiment of the invention, a distal end 134 of the ball 106 is left floating, allowing some slack for the ball 106 to slightly move about the tab 128 to realize an improved sealing between the ball 106 and the ball seat members 120.

A first seal of the valve 100, the stem seal 136, is used to seal an annular gap 150 (FIG. 2) in the stem aperture 122 between the valve body 102 and the stem 124. The stem seal 136 is preferably an annular self-expanding seal (SES) with a C-shaped cross section, with an open end that opens perpendicular to the plane of the stem seal 136. Hereinafter the C-shaped seal is also intended to describe, for example, a U-shape, a V-shape, or a winged seal that has an open end and a closed end, as discussed further below.

As shown in more detail in the cross-sectional view in FIG. 2, the stem seal 136 seats in an annular shoulder formed by stepped recess 138 in the stem aperture 122 of the valve body 102. The open end of the stem seal 136 points toward the ball 106. A height 140 of the stepped recess 138 is slightly taller than a height 142 of the stem seal 136.

A nut 144 is used for securing the stem 124 to the valve body 102. A bushing 146 is configured to seat against a top bearing surface 148 of the stepped recess 138 when pressed by the nut 144. Because the height 142 of the stem seal 136 is slightly less than the height 140 of the stepped recess 138, the bushing 146 does not compress the stem seal 136 at its closed end in a direction along the stem 124. In addition, owing to a recess 147 of suitable height on the underside of the bushing 146, a gap 149 exists between the bushing 146 and the stem 124. Thus, the bushing 146 does not compress the stem 124.

As fluids from the cavity 104 or from the fluid passage 116 attempt to escape from the annular gap 150, the pressure associated with such fluids tend to expand the stem seal 136, i.e., to open the stem seal 136 further, thus increasing the effectiveness of the sealing.

The nut 144 is preferably only hand tightened, such that a friction at the top bearing surface 148 is sufficiently low for achieving a low-torque stem operation. The low torque needed to rotate the stem 124 allows automatic actuation using a low-power motor, and/or hand actuation using the handle 126. In addition, the gap 149 between the bushing 146 and the top of the stem 124 allows some vertical slack for the stem 124 in the stem aperture 122. This also contributes to the low torque required to rotate the stem 124 and operate the valve 100.

Such a low-torque stem 124 is made possible as the stem seal 136, unlike the O-ring seals in conventional devices, does not need to be compressed to be effective. Conventional O-ring seals are "pre-loaded" compression seals, and require a nut threaded onto the stem to push the stem's seat downward onto the O-ring seal in order to compress the O-ring seal downward and outward. Consequently, any operational rotation of the conventional valve stems requires a minimum threshold of torque to overcome the frictional fitting inherent to conventional compression seals.

As shown in FIGS. 1 and 2, the stem 124 may be seated against a bearing washer 151, which in turn seats on a split ring or collar 152. The bearing washer 151 may be made of plastic, while the split ring 152 is preferably made of metal. One or more screws 154 may be used to secure other items to a flange (not numbered) on the valve body 102 around the stem 124. Such items may include, for example, a safety valve and/or a pressure indicator (not shown). A stem nut 156 is used to secure the handle 126 to the stem 124, and a lock pad 158 is disposed between the handle 126 and the hand tightened nut 144 to prevent rotation between the handle 126 and the stem 124.

Referring back to FIG. 1, the ball seat members 120 are retained in seat retainers 160, which are telescopically mounted in the cavity 104, as also shown in FIG. 2. Each of the seat retainers 160 has a stepped recess 162 for receiving a second SES 164. The second SES 164 is preferably also an annular seal and with a C-shaped cross section. An open end of the second SES 164 opens perpendicular to the plane of the second SES 164, is substantially along a direction of the fluid passage 116 and pointing away from the cavity 102. The second SES 164 has an outer diameter (O.D.) slightly larger than the O.D. of the seat retainer 160, and slightly larger than the inner diameter (I.D.) of the cavity 104 near the outer surface 110. Thus, the second SES 164 needs to be press fit into the annular space between the cavity 104 and the stepped recess 162, sealing off a gap 166 (shown exaggeratedly in FIG. 2) in the cavity 104 between the seat retainer 160 and the valve body 102.

When fluids, shown as arrows 167, attempt to escape through a gap 168 between the end cap 108 and the seat retainer 160, into the gap 166, the pressure associated with the fluids further opens the open end of the second SES 164, thus more effectively sealing off the gap 166. Thus, the fluids 167 cannot leak into the gap 166.

If the fluids 167 travel further along the gap 168, the fluid will encounter a third SES 170 embedded in a groove 172 on the outer surface 110 of the valve body 102. The third SES 170 has an open end that opens inwardly and in the plane of the third SES 170, toward the fluid passage 116. The third SES 170 expands under the pressure associated with the fluid 167, thus effectively sealing off the gap 168.

In the preferred embodiment shown in FIG. 2, the second SES 164 and the third SES 170 are substantially concentric, although their openings and expanding directions are orthogonal to each other. Those of ordinary skill in the art will recognize that more SES's may be included with various opening directions to enhance the effectiveness of sealing. This is particularly true if the valve is used in vacuum service, rather than in pressure service, such that the pressure direction is opposite of that shown.

In the embodiment shown in FIG. 2, the outer surface 110 of the valve body 102 is substantially flush with an end surface 174 of the seat retainer 160, and the two surfaces 110 and 174 are substantially in a plane 175. The third SES 170 protrudes only slightly out from the plane 175. This configuration simplifies the connection between the valve body 102 and the end cap 108, the latter preferably having a flat inner surface 176. The coupling between the end cap 108 and the valve body 102 can be realized using a plurality of body bolts 178 and nuts 180. The third SES 170 is only slightly pressed against the inner surface 176 of the end cap 108 when the third SES 170 is not subject to the fluid pressure from the fluids 167.

Although the embodiment shown in FIG. 1 has a substantially symmetric configuration with end caps and seals on both sides of the valve body 102, those of ordinary skill in the art will recognize that asymmetrical configurations can also use the concepts of the invention.

FIGS. 3A and 3B are presented to show the construction of the preferred SES members, e.g., SES's 136, 164, and 170. FIG. 3A provides a perspective view of a preferred embodiment of an SES 400 that generally corresponds to the third SES 170. As shown, the SES 400 comprises a pocket member 402 having an open end 401 and an opposite closed end 403, and a spring member 404 embedded in the pocket member 402. The pocket member 402 may be made of, for example, TEFLON®, plastic, rubber, etc. The spring member 404 may be made of metal, and provides a spring force to ensure an initial expansion of the pocket member 402, thus keeping the pocket member 402 open even when the SES 400 is not subject to any fluid pressure.

The pocket member 402 has a first sealing surface 406 and a second sealing surface 408. When the pocket member 402 is subject to a fluid pressure at the open end 401, the pocket member 402 tends to open in the direction shown by arrows 412, thus enhancing the effectiveness of the sealing surfaces 406 and 408. A third surface 414 in the closed end 403 of the pocket member 402 is usually not used as a sealing surface, although it is possible to do so when the pressure inside the pocket member 402 is so high that the pocket member 402 expands in a radial direction 413.

As shown, the expansion direction 412 of the SES 400 is along a longitudinal axial direction 416 of the SES 400, and the open end 401 of the pocket member 402 opens inwardly toward the axis 416. This is the case for the third SES 170 shown in FIG. 2.

FIG. 3B provides a perspective view of a preferred embodiment of an SES 420 that generally corresponds to the first SES 136 or the second SES 164 shown in FIG. 2. An open end 421 of the pocket member 424 opens perpendicular to the plane of the SES 420, and points along an axial direction 426 of the SES 420. Accordingly, the pocket member 422 expands in radial directions 422 orthogonal to the axis 426. Those of ordinary skill in the art will recognize that other directions for the open end are possible. For example, the open end may point outwardly away from the axial direction for certain applications.

Figure 4:
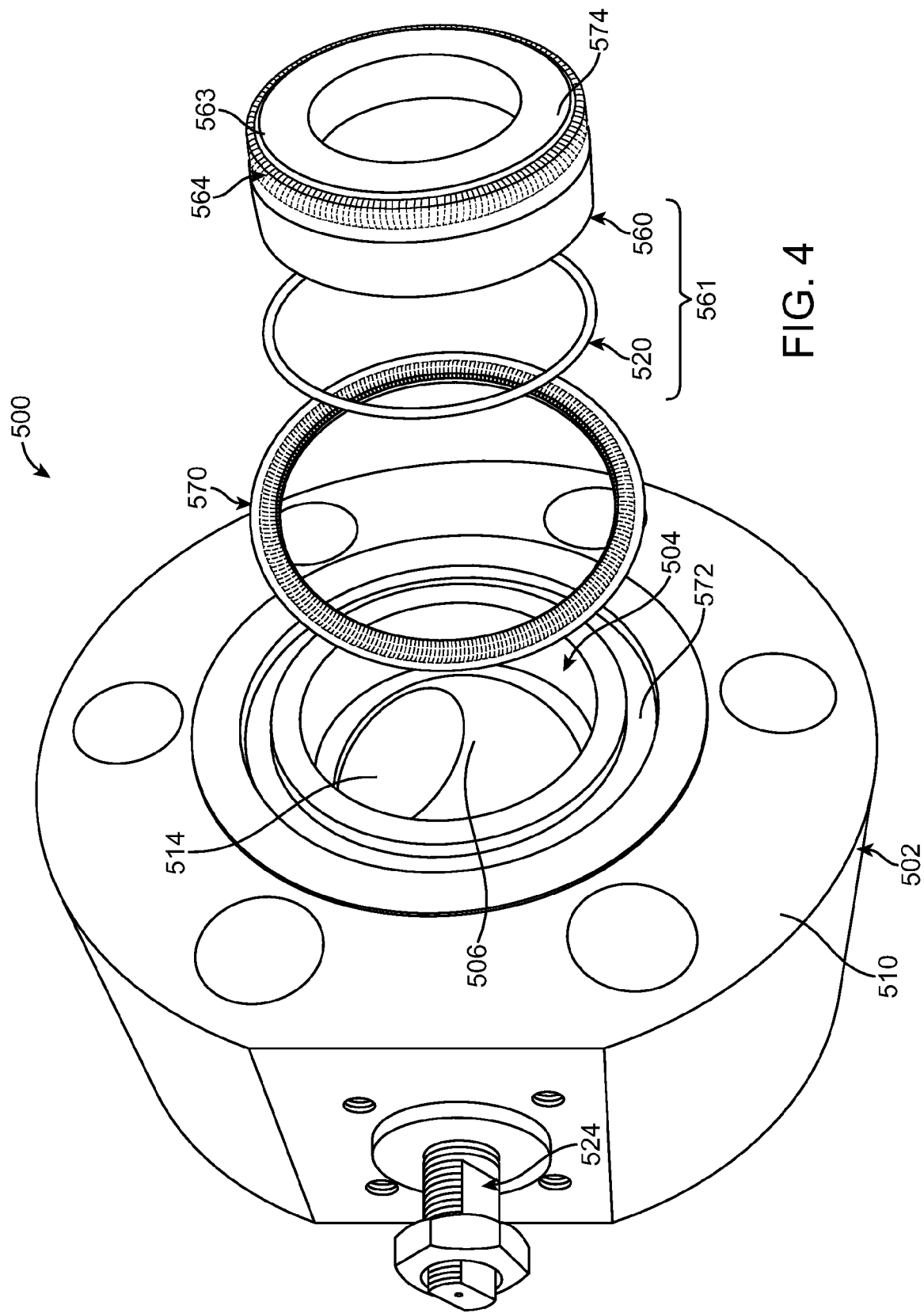
FIG. 4 is a partially exploded view of a ball valve in accordance with a second embodiment of the invention.

FIG. 4 shows a valve 500 in accordance with a second embodiment of the invention, which is larger in size as compared with the embodiment 100 shown in FIG. 1, and thus is more suitable for heavy-duty applications. As shown, a ball 506 is disposed in a cavity 504, and a through hole 514 of the ball 506 is partially aligned with a longitudinal axis of the seat member 520 and the seat retainer 560. Thus, the valve 500 is in a partially open state. The seat member 520 and the seat retainer 560 together are referred to as the seat assembly 561. The first SES for the stem 524 is not visible from this view. The second SES 564 is shown disposed on the seat retainer 560. Some pressure may be needed to fit the I.D. of the second SES 564 onto the O.D. of the stepped recess portion 563 of the seat retainer 560. The third SES 570 is removed from the groove 572 on the outer surface 510 of the valve body 502 for clarity.

Figure 5:
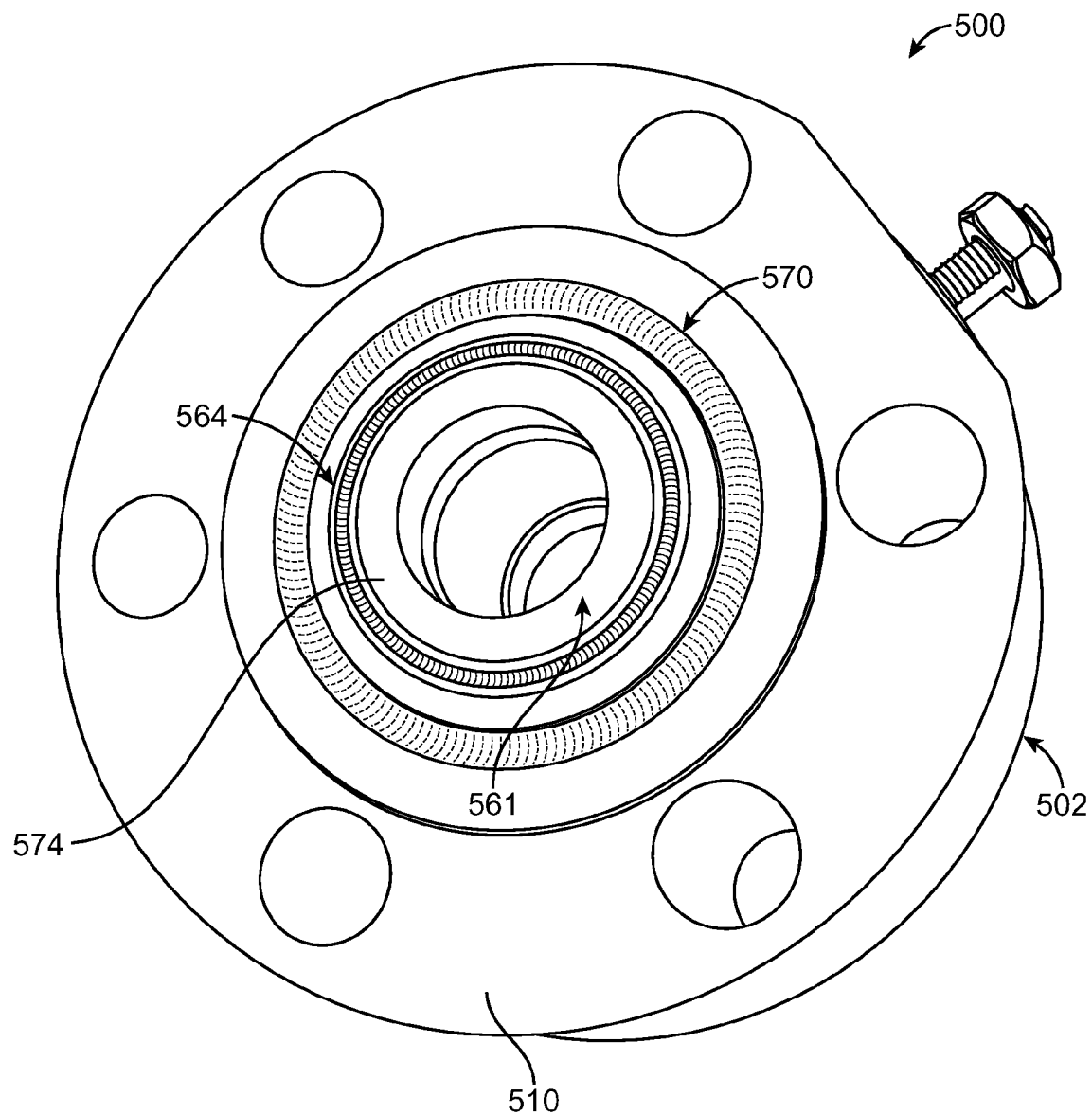
FIG. 5 is a perspective view of the ball valve of FIG. 4 when assembled.

FIG. 5 shows the valve 500 of FIG. 4 when the seat assembly 561 is telescopically mounted into the cavity 504. As shown, an end surface 574 of the seat assembly 561 is substantially flush with the outer surface 510 of the valve body 502. The third SES 570 protrudes slightly from the surface 510. Advantageously, the substantially flat surface of the assembled valve simplifies interconnecting the valve with end caps, pipes or flow lines.

FIG. 6 is a top view of the valve 500 approximately along the longitudinal direction of the stem 524 with the bushing removed, showing the stem seal 136 disposed around the stem 124 slightly lower than the bearing surface 148.

It will be appreciated that a method is also provided for assembling and/or sealing a valve device. In FIGS. 1 and 2, the method comprises providing a valve body 102 having a cavity 104 and a stem aperture 122, disposing a stopper member 106 in the cavity 104, providing a fluid passage 116 in fluidic communication with the cavity 104, disposing a stem 124 through the stem aperture 122 and coupling the stem 124 to the stopper member 106 at a proximal end 132 while leaving a distal end 134 of the stopper member 106 floating, providing a plurality of SES's 136, 164, and 170, disposing a first SES 136 around the stem 122, and disposing a second SES 164 and a third SES 170 substantially concentrically around the fluid passage 116.

The method may further comprise disposing a bushing 146 to seat against a top bearing surface 148 of the stepped recess 138 in the stem aperture 122 without compressing the first SES 136, and hand tightening a nut 144 onto the stem 124 against the bushing 146, thereby achieving a low-torque stem operation.

In FIGS. 4 and 5, the method further comprises providing a seat assembly 561 for seating the stopper member 506 and for forming a seal with the stopper member 506 when the valve device 500 is in its closed state, and telescopically mounting the seat assembly 561 into the cavity 504. Providing the seat assembly 561 comprises providing a seat member 520 and a seat retainer 560 having a stepped recess 563 for receiving the second SES 564, and coupling the seat member 520 and the seat retainer 560 to form the seat assembly 561. The method further comprises coupling the second SES 564 with the seat retainer 560 at the stepped recess 563.

Telescopically mounting the seat assembly 561 into the cavity 504 comprises press fitting the seat assembly 560 and the second SES 564 into the cavity 504 such that the second SES 564 and an end surface 574 of the seat retainer 560 are substantially flush with an outer surface 510 of the valve body 502. The method further comprises disposing the third SES 570 into a groove 572 on the outer surface 510 of the valve body 502 such that the third SES 570 and the second SES 564 are substantially concentric within a plane defined by the surfaces 574 and 510, and wherein the third SES 570 protrudes slightly from the plane.

It will be appreciated that the valves and the methods in accordance with embodiments of the invention can be applied to various valve systems and pipeline systems that need effective sealing between interconnections between valves and pipelines or between pipelines under a wide range of flow conditions.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A valve device, comprising:
    a valve body having a cavity;
    a stopper member disposed in the cavity;
    a fluid passage in fluidic communication with the cavity when the valve device is in an open state;
    a stem coupled to the stopper member for driving the stopper member to open or close the valve;
    a stem aperture in the valve body for the stem to extend therethrough;
    a first self-expanding seal (SES) around the stem;
    a second SES and a third SES around the fluid passage, wherein the second SES is bounded by the third SES;
    a seat assembly for seating the stopper member and for forming a seal with the stopper member when the device is in a closed state, wherein the seat assembly is telescopically mounted into the cavity,
    wherein the second SES is an annular seal and has a substantially C-shaped cross section with an open end and an opposing closed end, and wherein the open end is substantially along a direction of the fluid passage and pointing away from the cavity such that the second SES is configured to expand in a radial direction to seal off a gap between the seat assembly and the valve body when the second SES is subject to a pressure from the fluid passage;
    wherein the seat assembly has a stepped recess for receiving the second SES, wherein the open end of the second SES is substantially flush with an outer surface of the valve body when the seat assembly is telescopically mounted into the cavity, and wherein the outer surface has a groove for receiving the third SES such that the third SES and the second SES are substantially concentric in a plane along the gap between the end cap and the valve body.

2. The device of claim 1, wherein the first SES is an annular seal and has a substantially C-shaped cross section with an open end and an opposing closed end, and wherein the open end points substantially toward the cavity such that the first SES is configured to expand in a radial direction to seal off a gap in the stem aperture between the stem and the valve body when the first SES is subject to a pressure from the cavity.

3. The device of claim 2, wherein the valve body has a stepped recess in the stem aperture for receiving the first SES, the device further comprising:
    a nut for securing the stem to the valve body; and
    a bushing configured to seat against a top bearing surface of the stepped recess and to be pressed by the nut,
    wherein the a height of the stepped recess is slightly larger than a thickness of the first SES such that the bushing does not substantially compress the first SES at the closed end.

4. The device of claim 3, wherein a gap is formed between the bushing and the stem such that the bushing does not substantially press against the stem.

5. The device of claim 3, wherein the nut is a hand tighten nut such that a friction at the top bearing surface is sufficiently low to realize a low- torque stem operation.

6. The device of claim 1 wherein the second SES and the third SES are substantially concentric.

7. The device of claim 6, further comprising:
    an end cap configured to couple to the valve body,
    wherein the third SES is an annular seal and has a substantially C-shaped cross section with an open end and an opposing closed end, and wherein the open end points substantially toward the fluid passage such that the third SES expands along its axial direction and seals off a gap between the end cap and the valve body when the third SES is subject to a pressure from the fluid passage.

8. The device of claim 1, wherein the stopper member is a ball having a through hole, and wherein the ball is coupled to the stem at a proximal end to be rotated by the stem to open or close the valve and is floating on a distal end.

9. The device of claim 1, wherein the seat assembly comprises:
    a non-metal seat member to form the seal with the ball; and
    a seat retainer for retaining the seat member.

10. The device of claim 1, wherein each of the first SES, the second SES, and the third SES comprises:
    an annular pocket member with a substantially C-shaped cross section; and
    a spring member substantially enclosed in the annular pocket member for initially expanding the annular pocket member.

11. The device of claim 10, wherein the annular pocket member is made of one of the following materials: polytetrafluoroethylene, plastic, and rubber.

12. A method for assembling and sealing a valve device, comprising:
    providing a valve body having a cavity and a stem aperture;
    disposing a stopper member in the cavity;
    providing a fluid passage in fluidic communication with the cavity when the valve device in an open state;
    disposing a stem through the stem aperture and coupling the stem to the stopper member at a proximal end while leaving a distal end of the stopper member floating;
    providing a plurality of self-expanding seals (SES);
    disposing a first SES around the stem;
    disposing a second SES and a third SES around the fluid passage;
    providing a seat assembly for seating the stopper member and for forming a seal with the stopper member when the device is in the closed state; and
    telescopically mounting the seat assembly into the cavity,
    wherein providing a plurality of SES comprises providing the second SES as an annular seal having a substantially C-shaped cross section with an open end and an opposing closed end, and
    wherein disposing the second SES comprises pointing the open end of the second SES substantially along a direction of the fluid passage and away from the cavity such that the second SES is configured to expand in a radial direction to seal off a gap between the seat assembly and the valve body when the second SES is subject to a pressure from the fluid passage;
    coupling an end cap to the valve body, wherein providing a plurality of SES comprises providing the third SES as an annular seal having a substantially C-shaped cross section with an open end and an opposing closed end, and wherein disposing the third SES comprises pointing the open end of the third SES substantially toward the fluid passage such that the third SES is configured to expand longitudinally along its axial direction and seal off a gap between the end cap and the valve body when the third SES is subject to a pressure from the fluid passage;

providing a seat member and a seat retainer having a stepped recess for receiving the second SES;

coupling the seat member and the seat retainer to form the seat assembly;

coupling the second SES with the seat retainer at the stepped recess, wherein telescopically mounting the seat assembly into the cavity comprises press fitting the seat assembly and the second SES into the cavity such that the open end of the second SES is substantially flush with an outer surface of the valve body, and wherein disposing the third SES further comprises disposing the third SES into a groove on the outer surface of the valve body such that the third SES and the second SES are substantially concentric within a plane along the gap between the end cap and the valve body, and wherein the third SES protrudes slightly from the plane.

13. The method of claim 12, wherein providing a plurality of SES comprises providing the first SES as an annular seal having a substantially C-shaped cross section with an open end and an opposing closed end, and wherein disposing the first SES comprises disposing the open end substantially toward the cavity such that the first SES is configured to expand in a radial direction and seal off a gap in the stem aperture between the stem and the valve body when the first SES is subject to a pressure from the cavity.

14. The method of claim 13, wherein providing the valve body comprises providing the valve body having a stepped recess in the stem aperture for receiving the first SES, the method further comprising:

disposing a bushing to seat against a top bearing surface of the stepped recess without compressing the first SES; and tightening a nut onto the stem against the bushing.

15. The method of claim 14, wherein tightening the nut is though hand tightening such that a friction at the top bearing surface is sufficiently low for achieving a low- torque stem operation.

* * * * *